(12) United States Patent  (10) Patent No.: US 8,498,137 B2
Joseph  (45) Date of Patent: Jul. 30, 2013

(54) BOOST MULTILEVEL INVERTER SYSTEM

(75) Inventor: Alan Joseph, Chesterfield, MI (US)

(73) Assignee: Magna International, Inc., Ontario (CA)

(*) Notice: Subject to any disclaimer, the term of this patent is extended or adjusted under 35 U.S.C. 154(b) by 240 days.

(21) Appl. No.: 12/966,310

(22) Filed: Dec. 13, 2010

(65) Prior Publication Data

US 2011/0141779 A1    Jun. 16, 2011

Related U.S. Application Data

(60) Provisional application No. 61/285,612, filed on Dec. 11, 2009.

(51) Int. Cl.
*H02M 7/537* (2006.01)
(52) U.S. Cl.
USPC .......................................................... 363/131
(58) Field of Classification Search
USPC .............................. 363/16, 55, 59, 95, 97, 131
See application file for complete search history.

(56) References Cited

U.S. PATENT DOCUMENTS

| | | | |
|---|---|---|---|
| 7,068,010 B2* | 6/2006 | Youm | 318/778 |
| 7,177,168 B2* | 2/2007 | Toyomura et al. | 363/131 |
| 7,583,136 B2* | 9/2009 | Pelly | 327/551 |
| 7,733,069 B2* | 6/2010 | Toyomura et al. | 323/256 |
| 7,847,495 B2* | 12/2010 | Oyobe et al. | 318/53 |
| 7,911,816 B2* | 3/2011 | Miramonti | 363/97 |
| 8,212,493 B2* | 7/2012 | Melanson et al. | 315/247 |
| 2011/0215641 A1* | 9/2011 | Peterson et al. | 307/23 |

* cited by examiner

*Primary Examiner* — Adolf Berhane
(74) *Attorney, Agent, or Firm* — Dickinson Wright PLLC

(57) ABSTRACT

A boost inverter includes a first capacitor for connection in parallel with a dc supply voltage; a second capacitor connected in series with the first capacitor; an energy transfer path including a transfer capacitor and switches connected to the transfer capacitor for cyclically transferring energy from the first capacitor to the transfer capacitor and then from the transfer capacitor to the second capacitor; a multilevel inverter circuit connected in parallel with the series combination of the first and second capacitors, the inverter having at least one phase output for connection to an electric motor; and a PWM controller that activates the energy transfer path when a desired peak-to-peak output voltage exceeds the dc supply voltage and deactivates the energy transfer means when the desired peak-to-peak output voltage is less than the dc supply voltage.

7 Claims, 9 Drawing Sheets

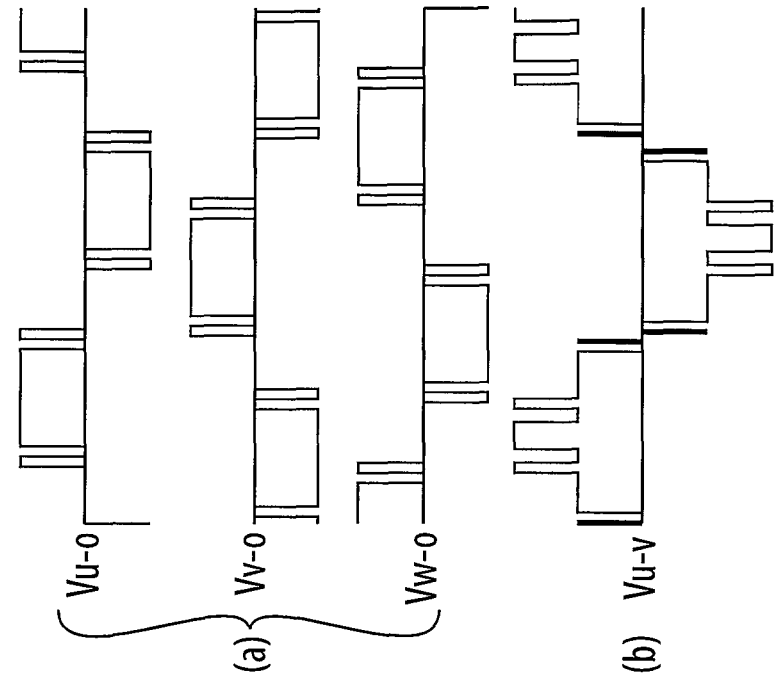
PRIOR ART FIG. 1C
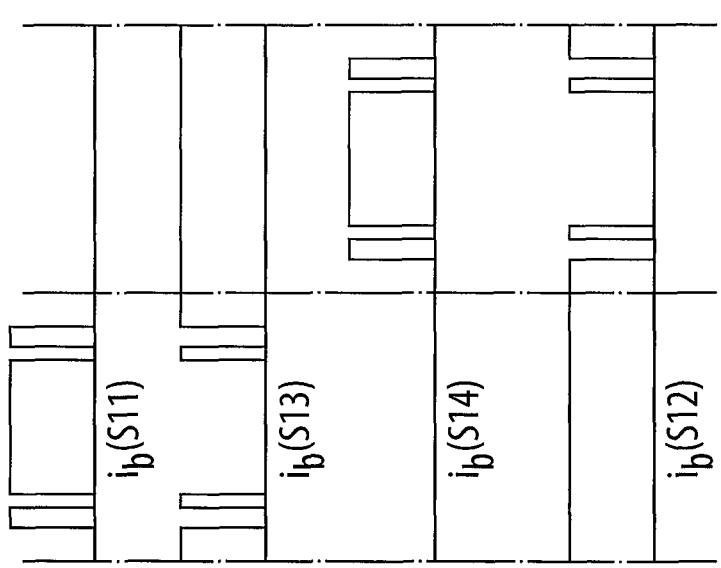
PRIOR ART FIG. 1B

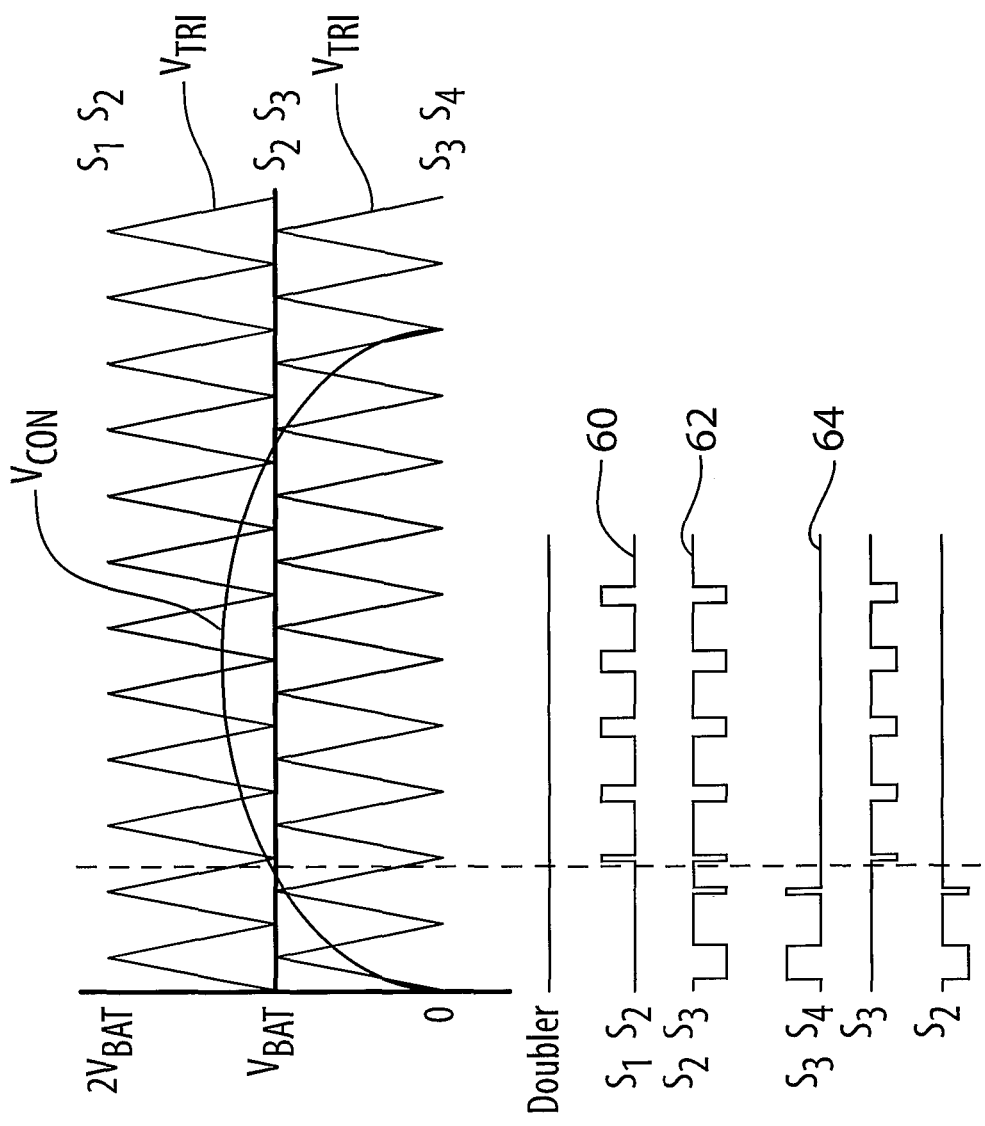

BOOST MULTILEVEL INVERTER SYSTEM

This application claims the benefits of U.S. Provisional Application No. 61/285,612, filed Dec. 11, 2009.

FIELD OF THE INVENTION

The invention relates to the art of switch-mode dc-to-ac inverters, and more particularly to a PWM inverter capable of supplying an output voltage higher than a dc supply voltage.

BACKGROUND OF THE INVENTION

Electric and/or hybrid internal combustion engine (ICE) and electric vehicles can utilize relatively large motors. For example, an electric-only vehicle may be powered by a 100 kilowatt electric motor, driven off of a 300 V battery pack.

At such power ratings, it is desirable to minimize the magnitude of current flowing through the inverter and electric motor to reduce $I^2R$ power losses and reduce the size of wires and their connectors. Lower current flows can also enable the electric motor to be made smaller and have less heat loss. However, this objective must be balanced against the voltage that the battery provides and the breakdown limitations of the inverter switches. Practical electric vehicle batteries have voltage and current limitations associated therewith as the battery can only handle a certain state of charge. And switches with high breakdown voltages tend to cost more.

The efficiency of the inverter is also a prime design consideration. Multi-level inverters, which utilize an array of switching devices in series to perform the power conversion in a small increase of voltage steps by synthesizing a staircase voltage from several levels of series DC capacitor voltages connected in parallel with a power source, are known in the art. The multi-level inverter has lower dv/dt stresses on the switching devices in comparison to a conventional PWM inverter due to smaller voltage increments and thus can utilize smaller rated semiconductor devices. The multi-level inverter also features a better output voltage in terms of less distortion, lower harmonic content and lower switching losses in comparison to a conventional full bridge PWM inverter. See for example Mailah et. al, "Neutral-Point-Clamped Mutlilevel Inverter Using Space Vector Modulation", ISSN 1450-216X Vol. 28, No. 1 (2009), pp. 82-91, EuroJournals Publishing, Inc.

One well-known neutral-point-clamped (NPC) PWM inverter is described by Nabae et al., "A New Neutral-Point-Clamped PWM Inverter", IEEE Transactions on Industry Applications, Vol. 1A-17, No. 5, September/October 1981 and reproduced here as FIG. 1A. Discussing only one leg, in this inverter $S_{11}$, $S_{14}$ are the main transistors that act as PWM switches coupling load phase A to the positive and negative bus of the power source $E_d$. $S_{12}$, $S_{13}$ are auxiliary transistors that, together with diodes $D_{11}$, $D_{12}$, clamp the output terminal (A) to the neutral point potential N. The auxiliary transistors $S_{13}$, $S_{12}$ are driven complementary to the main transistors $S_{11}$, $S_{14}$, respectively. FIG. 1B shows the drive signals for the transistors, which may be provided utilizing conventional PWM techniques, such as by comparing a sinusoidal control voltage against a higher frequency triangular switching reference signal. FIG. 1C shows the output voltage waveforms for the inverter.

It would be desirable to utilize an inverter topology such as the NPC PWM inverter to drive an electric motor at a much higher voltage than that provided by the battery. And in such a use, it would be desirable to operate the inverter to minimize switching losses.

SUMMARY OF THE INVENTION

According to one broad aspect of the invention a boost inverter is provided. The boost inverter includes a first capacitor for connection in parallel with a dc supply voltage; a second capacitor connected in series with the first capacitor; energy transfer means including a transfer capacitor and switches connected to the transfer capacitor for cyclically transferring energy from the first capacitor to the transfer capacitor and then from the transfer capacitor to the second capacitor; a multilevel inverter circuit connected in parallel with the series combination of the first and second capacitors, the inverter having at least one phase output for connection to an electric motor; and a PWM controller that activates the energy transfer means when a desired peak-to-peak output voltage exceeds the dc supply voltage and deactivates the energy transfer means when the desired peak-to-peak output voltage is less than the dc supply voltage.

BRIEF DESCRIPTION OF THE DRAWINGS

The foregoing and other aspects of the invention will be more readily appreciated having reference to the drawings, wherein:

FIGS. 1A, 1B and 1C are circuit and timing diagrams of a prior art inverter;

FIG. 7B is a schematic diagram showing the control methodology for the boost multilevel inverter circuit in a second mode of operation for driving an electric motor utilizing a peak to peak voltage higher than the dc supply voltage.

DETAILED DESCRIPTION OF THE INVENTION

Figure 1A:
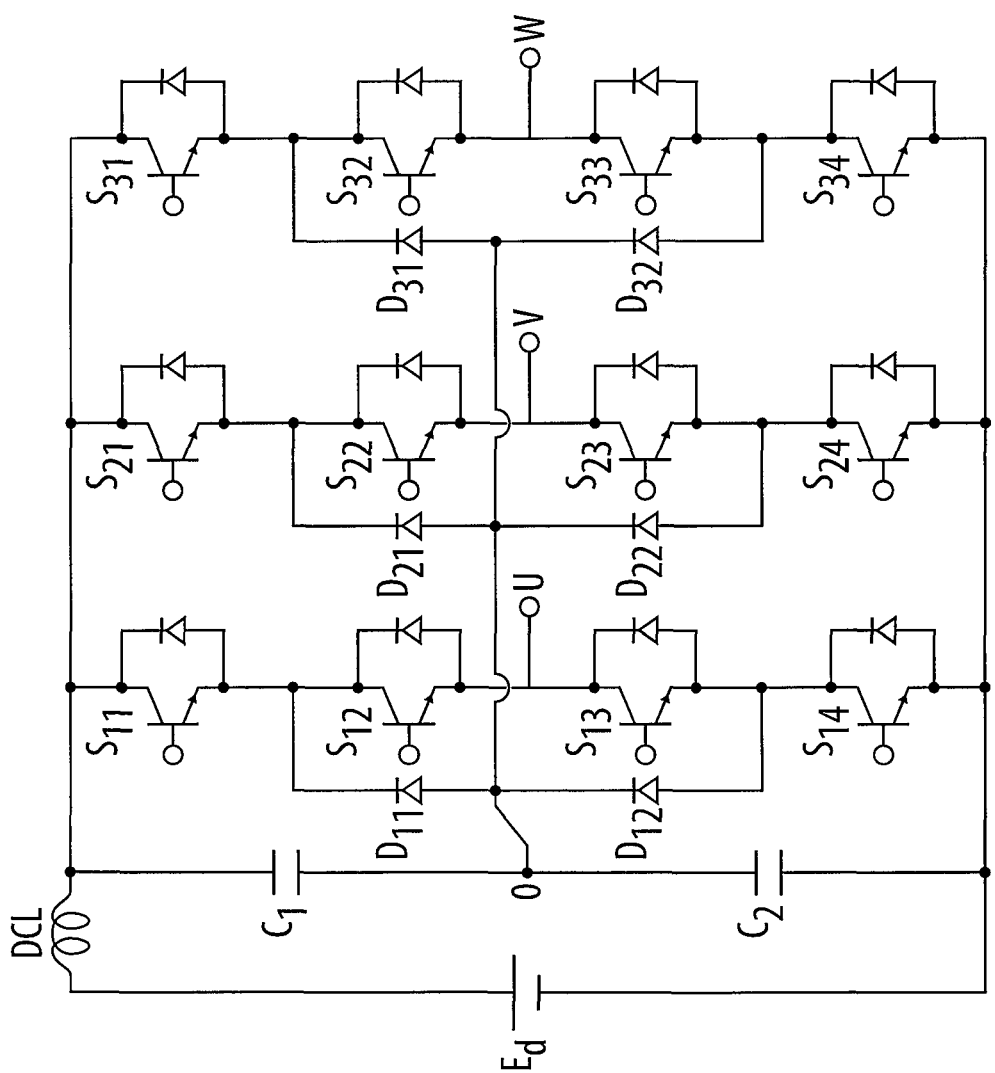
Figure 2:
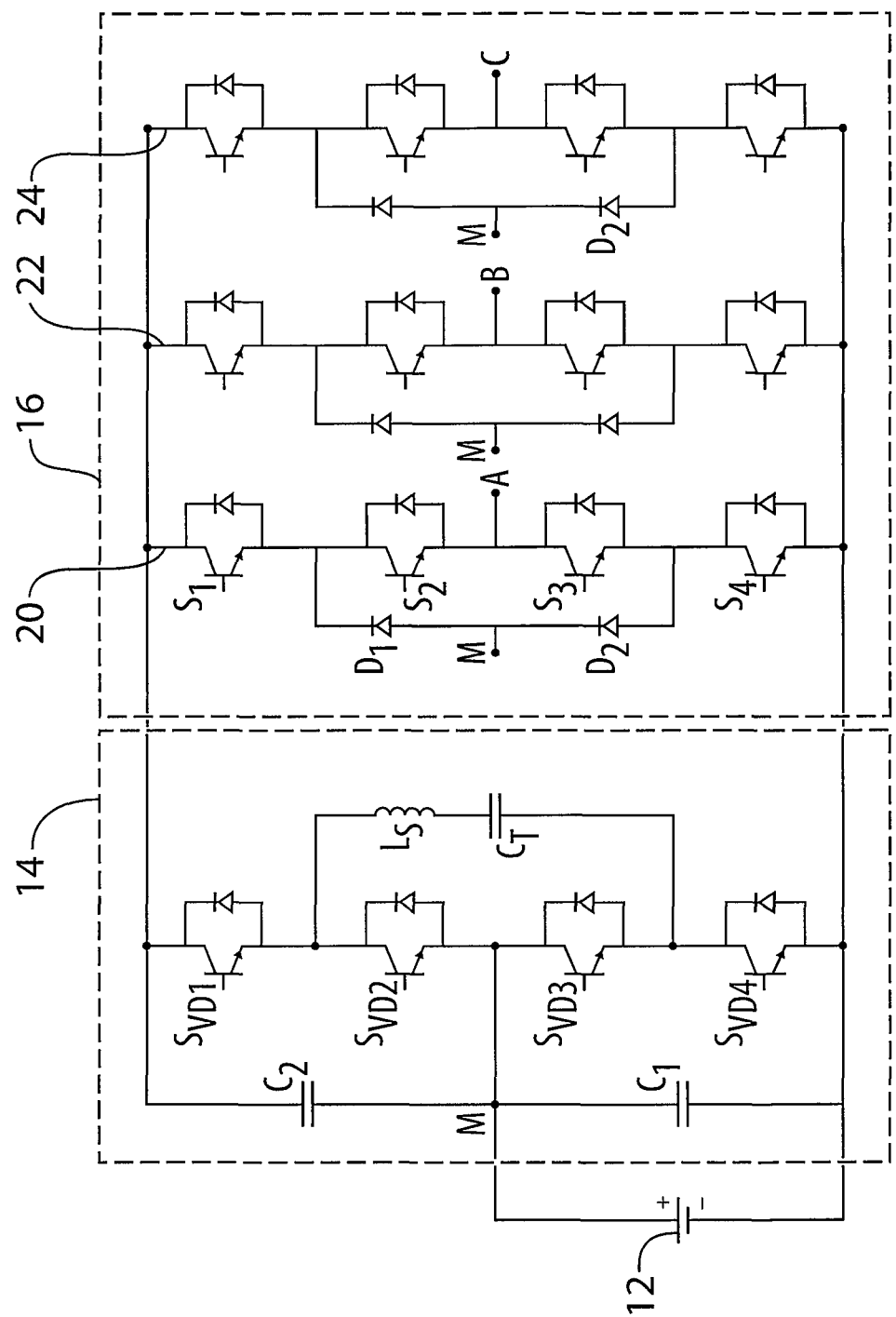
FIG. 2 is a circuit diagram of a boost multilevel inverter circuit according to a preferred embodiment which can supply a PWM voltage to drive an electric motor with a peak to peak voltage much higher than that provided by a dc source.

FIG. 2 shows the topology of a circuit 10 according to a preferred embodiment invention which includes a voltage doubler 14 connected between a battery 12 and an inverter 16. As described in greater detail below, the voltage doubler 14 selectively is capable of supplying the inverter 16 with a voltage approximately twice the voltage $V_{bat}$ of the battery 12. And unlike the prior art NPC PWM inverter, inverter 16 is selectively controlled in one of two modes either as a conventional PWM inverter or as a multi-level clamped inverter depending on power requirements as discussed in greater detail below.

More particularly, the voltage doubler 14 includes a first capacitor $C_1$ connected in parallel with the battery 12. A second capacitor $C_2$ is connected in series with $C_1$ with the positive battery terminal connected to node M between $C_1$ and $C_2$. An energy transfer path includes switches $S_{VD1}$, $S_{VD2}$ disposed opposite $C_2$, switches $S_{VD3}$, $S_{VD4}$ disposed opposite $C_1$ as shown. The junction between $S_{VD2}$ and $S_{VD3}$ is tied to node M. An energy transfer capacitor $C_T$ has a first end connected between switches $S_{VD1}$, $S_{VD2}$ and a second end connected between switches $S_{VD3}$, $S_{VD4}$. A smoothing inductor $L_S$ is serially connected to the energy transfer capacitor $C_T$.

The illustrated inverter 16 is designed to power a 3-phase motor and thus has three parallel switching legs 20, 22, 24, each leg having four serially arranged switches $S_1$, $S_2$, $S_3$, and $S_4$. Each leg also features clamping diodes $D_1$, $D_2$ connected to node M and between the first and second switches $S_1$, $S_2$ and the third and fourth switches $S_3$, $S_4$, respectively. The phase output (A, B, or C) of each leg is located between switches $S_2$ and $S_3$.

Each switch may be implemented by a transistor such as an IGBT along with a reverse diode (as shown) as known in the art per se.

Figure 3B:
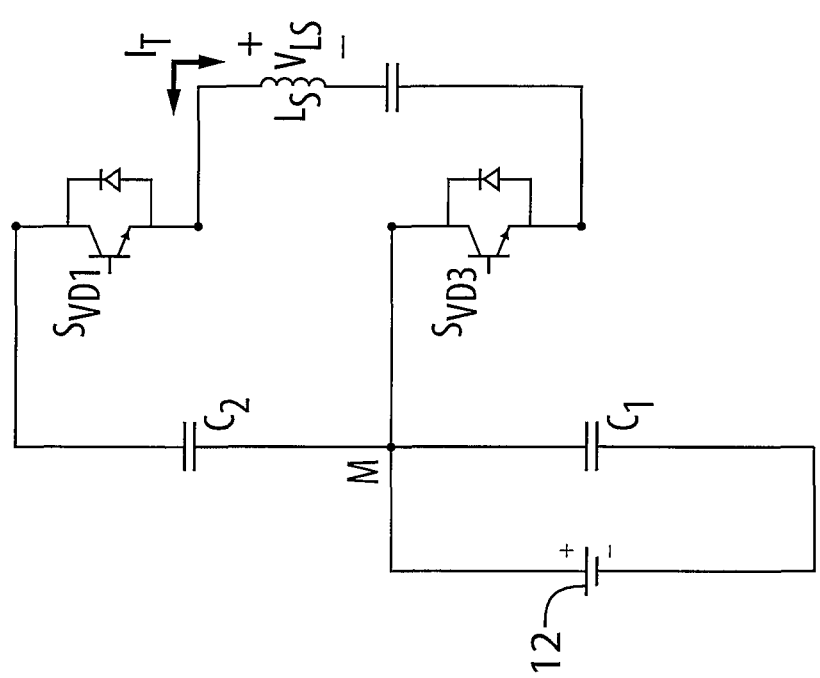
FIGS. 3A, 3B, 3C and 3D are circuit diagrams of a boost circuit shown in FIG. 1 at various points in a switching cycle.
Figure 3A:
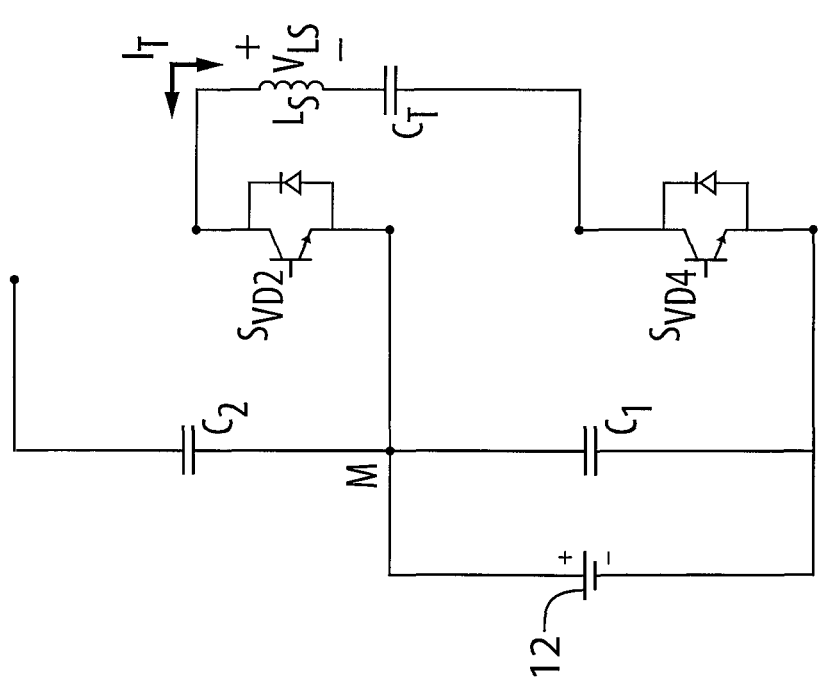

When activated, the voltage doubler 14 operates as follows. The battery continuously charges $C_1$ so as to apply a voltage $V_{bat}$ across $C_1$. In order to transfer energy to or from $C_2$, a repetitive sequence of steps occurs. In a first step, as shown in the isolated view of FIG. 3A, switches $S_{VD1}$, $S_{VD3}$ are opened and $S_{VD2}$, $S_{VD4}$ are closed for a period of time $t_1$ to bring $C_T$ in parallel with $C_1$ through Ls. Current will increase in Ls such that it flows from a higher voltage potential to a lower potential until C1 and Ct are at the same potential. The inductor current will then decrease, approaching zero. If C1 started with a higher voltage potential than Ct, energy will have flowed from C1 to Ct and Ct will now have a higher potential. Otherwise energy flowed from Ct to C1 and now Ct will have a lower voltage potential than C1. As a second step, switches $S_{VD2}$, $S_{VD4}$ are opened when the current through Ls is near zero and after a short deadtime, switches $S_{VD1}$, $S_{VD3}$ are closed for a period of time $t_2$ as shown in the isolated view of FIG. 3B to bring $C_T$ in parallel with $C_2$. As described above, energy again flows from the capacitor with higher potential to the capacitor with lower potential Thus, a voltage $2*V_{bat}$ appears across $C_1$ and $C_2$. During motoring, the energy in $C_2$ is utilized to power the motor, its charge will begin to drop, and energy will flow from C1, to Ct, and then to C2. During generating, the charge in C2 will increase, and energy will then flow from C2, to Ct, and then to C1.

Figure 3D:
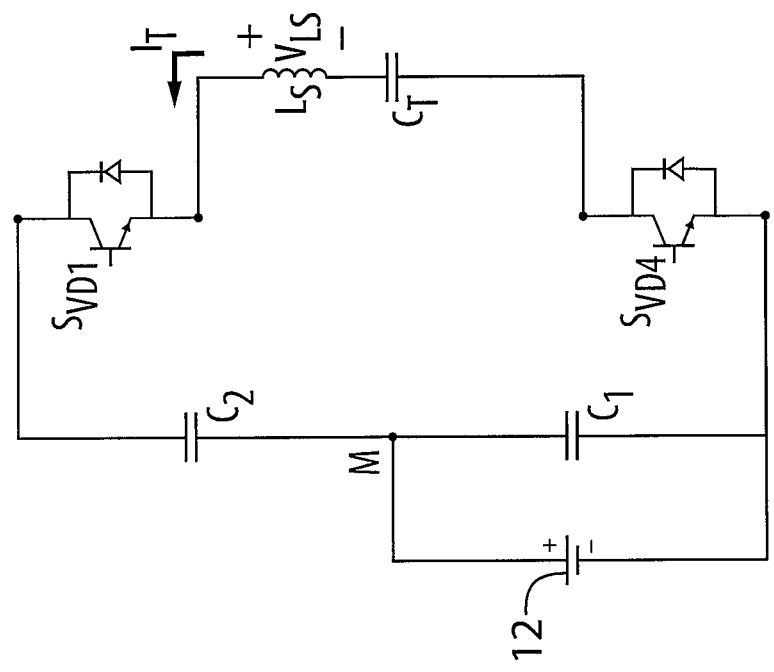
Figure 3C:
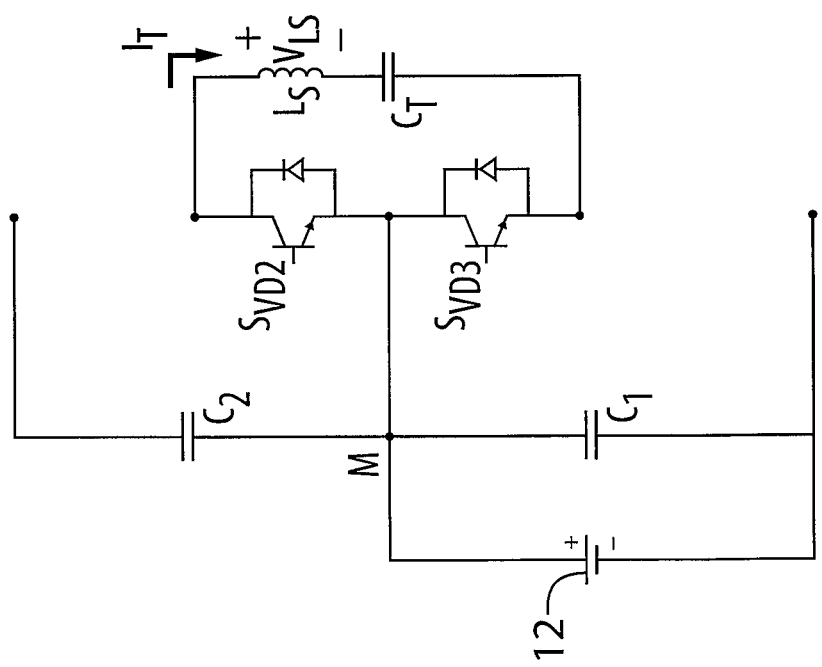
Figure 5:
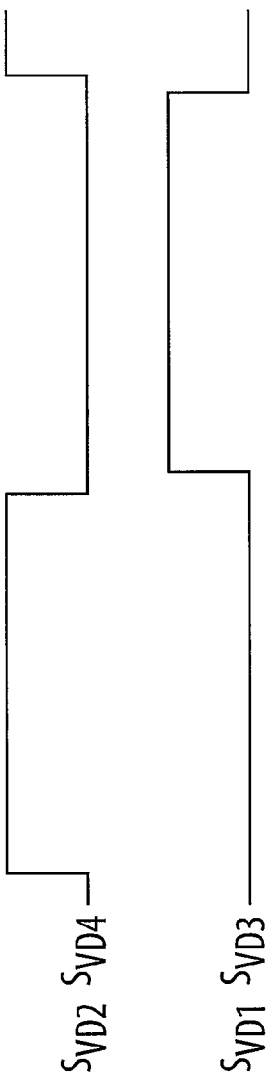
FIG. 5 is a timing diagram of the switching cycle.

FIG. 5 shows the switching pattern 30 for the switches $S_{VD1}$, $S_{VD3}$ and $S_{VD2}$, $S_{VD4}$. It will be noticed there is a very short dead time as one set of switches turns off and the other set of switches turn on. During the dead time, the current generated by the inductor $L_S$ freewheels through the reverse diodes of the switches $S_{VD2}$, $S_{VD3}$ or $S_{VD1}$, $S_{VD4}$ depending on the direction of the current as shown in the isolated views of FIGS. 3C and 3D.

The frequency of the switching pattern 30 (i.e., the switching frequency of the voltage doubler 14) is preferably kept constant and may vary over a wide range, depending on the application at hand. The switches $S_{VD1}$, $S_{VD3}$ and $S_{VD2}$, $S_{VD4}$ are preferably utilized at a duty cycle of about 45%.

Figure 4:
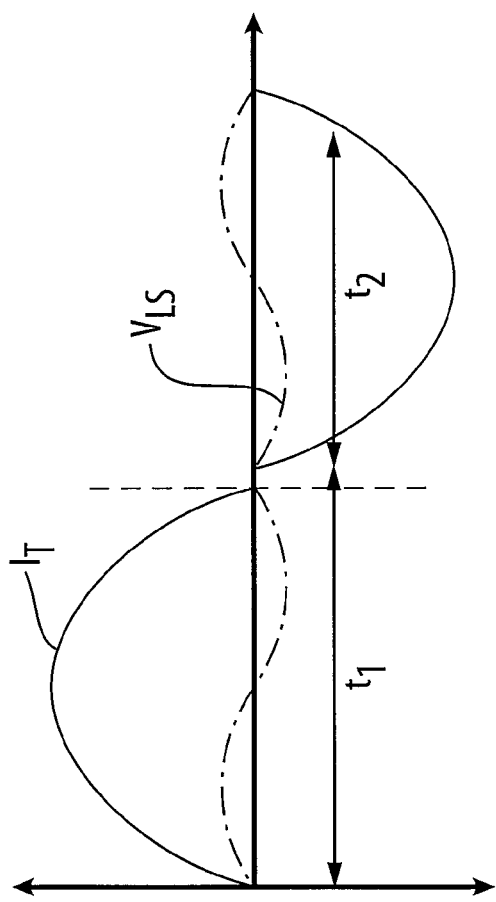
FIG. 4 is a graph illustrating changes in current and voltage over the switching cycle of the boost circuit.

The smoothing inductor $L_S$ inhibits rapid current changes. The inductance of $L_S$ along with the capacitance of $C_T$ are preferably selected so as to provide a resonance correlated to the switching frequency. FIG. 4 shows the current $I_T$ during $t_1$ and $t_2$ and the voltage $V_{LS}$ across the inductor $L_S$ for the same periods. To minimize switching losses $S_{VD1}$, $S_{VD3}$ and $S_{VD2}$, $S_{VD4}$ are preferably switched when the current $I_T$ is at or near zero.

Figure 6:
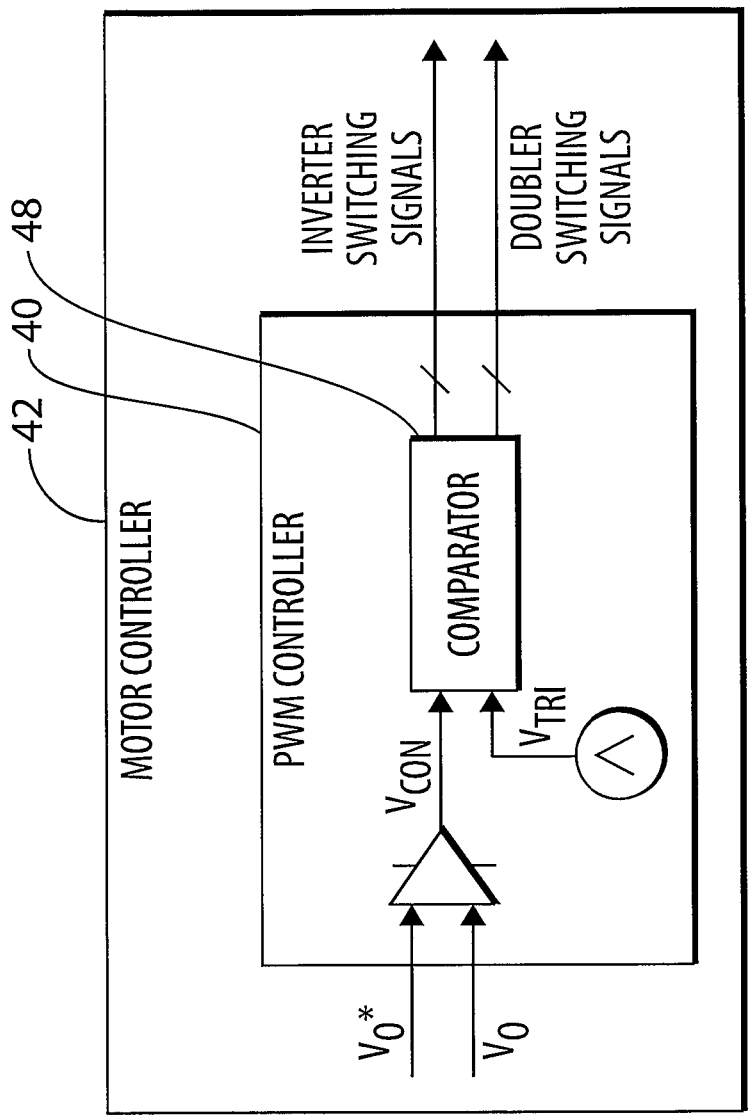
FIG. 6 is a schematic block diagram of a PWM controller.
Figure 7A:
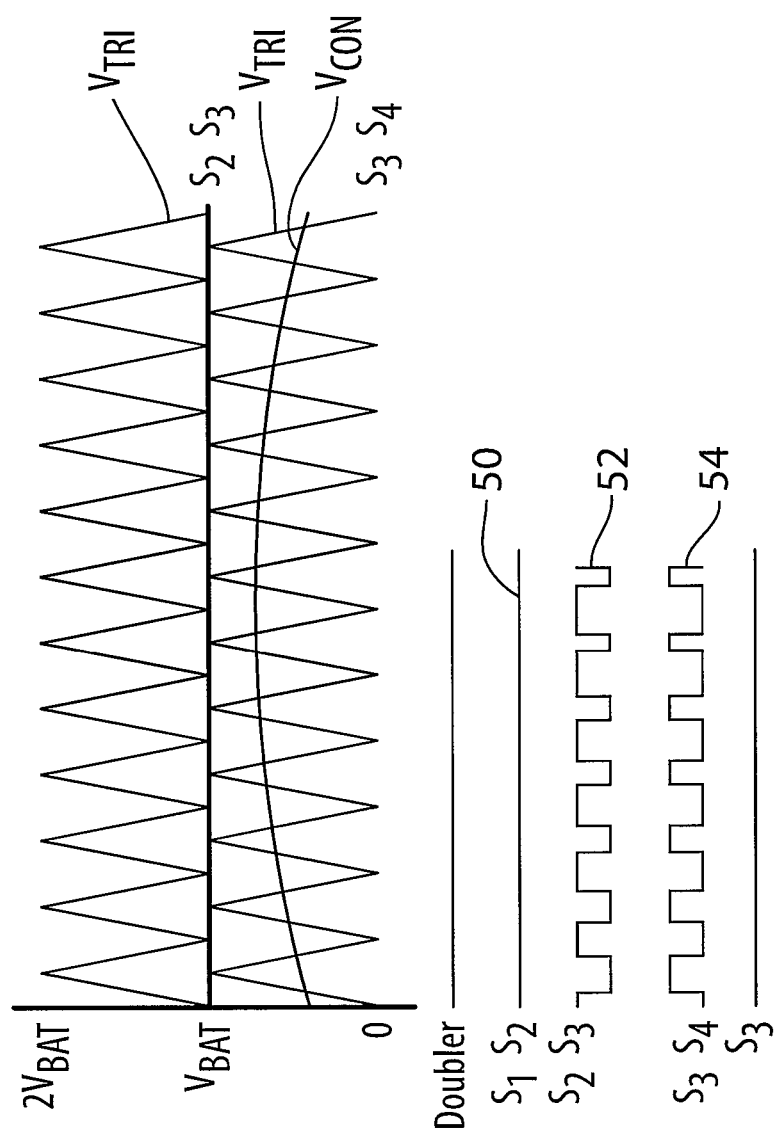
FIG. 7A is a schematic diagram showing the control methodology for the boost multilevel inverter circuit in a first mode of operation for driving an electric motor utilizing a peak to peak voltage less than the dc supply voltage.

FIGS. 7A and 7B show the operation of the inverter 16 in relation to a PWM controller 40 that forms part of a larger motor controller 42 shown in FIG. 6. The motor controller 42 supplies as an input to the PWM controller a desired output voltage $V_O^*$, that is scaled by the PWM controller to a control voltage $V_{CON}$. $V_{CON}$ is compared against a triangular reference signal $V_{TRI}$. The desired output voltage $V_O^*$ ranges from 0 volts to double the battery voltage, i.e., for all intents and purposes the motor controller 42 is configured to operate on a battery having an output voltage of $2V_{bat}$. A comparator 48 determines the peak to peak voltage requested.

When the peak to peak of the desired voltage $V_O^*$ is lower than $V_{bat}$ as seen scaled in FIG. 7A, the voltage doubler 14 is deactivated and all of its switches are turned off. This leaves capacitor $C_1$ in parallel with the battery such that node M is tied to the positive terminal of the battery whereby C1 is presented with a voltage of $V_{bat}$ across it but $C_2$ has no voltage across it. In this case, switch pair $S_1$,$S_2$ is off and the inverter is operated by manipulating switch pairs $S_2$, $S_3$ and $S_3$,$S_4$ as seen in exemplary timing diagrams 50, 52, 54. It will be noted that $S_3$ is on continuously, $S_2$ switches according to timing diagram 52, and $S_4$ switches according to timing diagram 54.

When $S_2$ and $S_3$ are on, the phase output is connected to node M or the positive terminal of the battery 12. When $S_3$ and $S_4$ are on, the phase output is connected to the negative terminal of the battery 12.

The switching losses in this mode are relatively low in that $S_3$ is continuously on, so there are no switching losses there.

This mode of operation where the voltage doubler 14 is deactivated is most likely to be utilized by the motor controller at slow motor speeds where torque demands are high requiring high current but low output voltage from the inverter 16.

When the peak to peak of the desired voltage $V_O^*$ is higher than $V_{bat}$ as seen scaled in FIG. 7A, the voltage doubler 14 is activated. In the application of a motor controller, the voltage doubler would be activated under any condition that the desired voltage may possibly have a step increase or sharp ramp increase such that the peak to peak of $V_O^*$ is higher than $V_{bat}$ (A soft start routine is provided to inhibit excess current inrush to CT and C2.) As discussed above, capacitor $C_1$ will have a voltage of $V_{bat}$ across it and $C_2$ will have a voltage of $V_{bat}$ across it. When Vo is higher than Vbat, switch pair $S_3$,$S_4$ is off and the inverter 16 is operated by manipulating switch pairs $S_1$, $S_2$ and $S_2$,$S_3$ as seen in exemplary timing diagrams 60, 62, 64. It will be noted that $S_2$ is on continuously, $S_1$ switches according to timing diagram 60, and $S_3$ switches according to timing diagram 62.

When $S_1$ and $S_2$ are on, the phase output is connected to the higher potential terminal of $C_2$, thus delivering a voltage of $2V_{bat}$ to the phase output. When $S_2$ and $S_3$ are on, the phase output is connected to node M or the positive terminal of the battery 12.

This mode of operation where the voltage doubler 14 is activated is most likely to be utilized by the motor controller at high motor speeds.

It will be appreciated from the foregoing that although the term "doubler" has been used to characterize the voltage doubler 14, the boost voltage provided by the sub-circuit may be slightly less or greater than double the supply voltage.

While the above describes a particular embodiment(s) of the invention, it will be appreciated that modifications and variations may be made to the detailed embodiment(s) described herein without departing from the spirit of the invention.

The invention claimed is:
1. A boost inverter system, comprising:
 a first capacitor for connection in parallel with a dc supply voltage;
 a second capacitor connected in series with the first capacitor;
 energy transfer means including a transfer capacitor and switches connected to the transfer capacitor for cycli- cally transferring energy from the first capacitor to the transfer capacitor and then from the transfer capacitor to the second capacitor;

a multilevel inverter circuit connected in parallel with the series combination of the first and second capacitors, the inverter having at least one phase output for connection to an electric motor; and a PWM controller that activates the energy transfer means when a desired peak-to-peak output voltage exceeds the dc supply voltage and deactivates the energy transfer means when the desired peak-to-peak output voltage is less than the dc supply voltage.

2. A system according to claim 1, wherein the multilevel inverter includes a plurality of switching legs, each leg comprising first (S1), second (S2), third (S3) and fourth (S4) switches, the phase output being disposed at a node between the S2 and S3 switches, the S2 and S3 switches also each being connected via a diode to a node M between the first and second capacitors.

3. A system according to claim 2, wherein the PWM controller operates in a first mode when the desired peak-to-peak output voltage exceeds the dc supply voltage and operates in a second mode when the desired peak-to-peak output voltage is less than the dc supply voltage.

4. A system according to claim 3, wherein: in the first mode S2 is on and S1 and S3 are cyclically switched on and off; and in the second mode S3 is on and S2 and S4 are cyclically switched on and off.

5. A system according to claim 4, wherein the energy transfer means includes first (SVD1), second (SVD2), third (SVD3) and fourth (SVD4) switches;

the SVD2 and SVD3 switches being connected to node M;

the SVD1 switch being connected the second capacitor and the SVD2 switch;

the SVD4 switch being connected between the SVD3 switch and the first capacitor; and the transfer capacitor being connected to a first node between SVD1 and SVD2 and a second node between SVD3 and SVD4.

6. A system according to claim 5, wherein the energy transfer means includes a smoothing inductor connected in series with the transfer capacitor.

7. A system according to claim 1, wherein the energy transfer means includes a smoothing inductor connected in series with the transfer capacitor.

* * * * *